United States Patent
Kao

(10) Patent No.: US 12,450,490 B2
(45) Date of Patent: Oct. 21, 2025

(54) NEURAL NETWORK CONSTRUCTION METHOD AND APPARATUS HAVING AVERAGE QUANTIZATION MECHANISM

(71) Applicant: REALTEK SEMICONDUCTOR CORPORATION, Hsinchu (TW)

(72) Inventor: Yu-Che Kao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 801 days.

(21) Appl. No.: 17/830,827

(22) Filed: Jun. 2, 2022

(65) Prior Publication Data

US 2023/0114610 A1 Apr. 13, 2023

(30) Foreign Application Priority Data

Oct. 1, 2021 (TW) ................................. 110136791

(51) Int. Cl.
*G06N 3/082* (2023.01)
*G06N 3/0495* (2023.01)

(52) U.S. Cl.
CPC ........... *G06N 3/082* (2013.01); *G06N 3/0495* (2023.01)

(58) Field of Classification Search
CPC ..................................................... G06N 3/082
See application file for complete search history.

(56) References Cited

PUBLICATIONS

Guest, Olivia. "Using the Gini coefficient to evaluate deep neural network layer representations." Blog post. <Neuroplausible.com/gini> (2017). (Year: 2017).*
Long, Xin, et al. "Learning sparse convolutional neural network via quantization with low rank regularization." IEEE Access 7 (2019): 51866-51876. (Year: 2017).*
B. L.Deng, G.Li, S.Han, L.Shi, andY.Xie, "Model Compression and Hardware Acceleration for Neural Networks: a Comprehensive Survey," Proc. IEEE, vol. 108, No. 4, pp. 485-532, 2020.
R.Krishnamoorthi, "Quantizing deep convolutional networks for efficient inference: a whitepaper," arXiv Prepr. arXiv1806.08342, 2018.

(Continued)

*Primary Examiner* — Eric Nilsson
(74) *Attorney, Agent, or Firm* — WPAT, PC

(57) ABSTRACT

The present invention discloses a neural network construction method having average quantization mechanism that includes steps outlined below. A weight combination included in each of network layers of a neural network is retrieved. A loss function is generated according to the weight combination of all the network layers and target values. Corresponding to each network layers, a Gini coefficient of the weight combination is calculated and the Gini coefficients corresponding to all the network layers are accumulated as a regularized correction term. The loss function and the regularized correction term are merged as a regularized loss function to perform training on the neural network accordingly to generate a trained weight combination of each of the network layers. A quantization is performed on the trained weight combination of each of the network layers to generate a quantized neural network, in which each of the network layers thereof includes the trained weight combination.

6 Claims, 3 Drawing Sheets

(56) References Cited

PUBLICATIONS

B.Jacob et al., "Quantization and Training of Neural Networks for Efficient Integer-Arithmetic-Only Inference," in 2018 IEEE/CVF Conference on Computer Vision and Pattern Recognition, 2018, pp. 2704-2713.

T.Sheng, C.Feng, S.Zhuo, X.Zhang, L.Shen, andM.Aleksic, "A Quantization-Friendly Separable Convolution for MobileNets," in 2018 1st Workshop on Energy Efficient Machine Learning and Cognitive Computing for Embedded Applications (EMC2), 2018, pp. 14-18.

M.Alizadeh, A.Behboodi, M.vanBaalen, C.Louizos, T.Blankevoort, andM.Welling, "Gradient L1 Regularization for Quantization Robustness," in International Conference on Learning Representations, 2020.

Y.Choi, M.El-Khamy, andJ.Lee, "Learning Sparse Low-Precision Neural Networks With Learnable Regularization," IEEE Access, vol. 8, pp. 96963-96974, 2020.

O.Guest, "Using the Gini coefficient to evaluate deep neural network layer representations," Blog post, 2017.

\* cited by examiner

NEURAL NETWORK CONSTRUCTION METHOD AND APPARATUS HAVING AVERAGE QUANTIZATION MECHANISM

BACKGROUND OF THE INVENTION

1. Field of the Invention

The present invention relates to a neural network construction method and a neural network construction apparatus having average quantization mechanism.

2. Description of Related Art

Deep learning technology is a branch of machine learning technology that is an algorithm using artificial neural network to learn the characteristic of data. In recent years, under the development of technologies such as big data analytics and artificial intelligence (AI), more and more applications that use embedded systems to implement the deep learning technology are presented.

Since floating-point operations is hard for the hardware to perform, the floating-point weights of the neural network need to be quantized to become integers. However, the accuracy of the weights may decrease during the process of quantization such that the accuracy of the whole neural network decreases as well.

SUMMARY OF THE INVENTION

In consideration of the problem of the prior art, an object of the present invention is to supply a neural network construction method and a neural network construction apparatus having average quantization mechanism.

The present invention discloses a neural network construction method having average quantization mechanism that includes steps outlined below. A weight combination included in each of network layers of a neural network is retrieved. A loss function is generated according to the weight combination of all the network layers and a plurality of target values. Corresponding to each of the network layers, a Gini coefficient of the weight combination is calculated and the Gini coefficient of each of the network layers is accumulated as a regularized correction term. The loss function and the regularized correction term are merged to generate a regularized loss function to perform training on the neural network according to the regularized loss function, so as to generate a trained weight combination of each of the network layers. Quantization is performed on the trained weight combination of each of the network layers to generate a quantized neural network, in which each of the network layers of the quantized neural network includes the quantization weight combination.

The present invention also discloses a neural network construction apparatus having average quantization mechanism that includes a storage circuit and a processing circuit. The storage circuit is configured to store a computer executable command. The processing circuit is configured to retrieve and execute the computer executable command to execute a neural network construction method that includes steps outlined below. A weight combination included in each of network layers of a neural network is retrieved. A loss function is generated according to the weight combination of all the network layers and a plurality of target values. Corresponding to each of the network layers, a Gini coefficient of the weight combination is calculated and the Gini coefficient of each of the network layers is accumulated as a regularized correction term. The loss function and the regularized correction term are merged to generate a regularized loss function to perform training on the neural network according to the regularized loss function, so as to generate a trained weight combination of each of the network layers. Quantization is performed on the trained weight combination of each of the network layers to generate a quantized neural network, in which each of the network layers of the quantized neural network includes the quantization weight combination.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a neural network construction method and a neural network construction apparatus having average quantization mechanism to use a Gini coefficient to allow a loss function reflecting a distribution condition of weights, such that a training process of a neural network can make the distribution of the weights even to increase the accuracy of quantization.

Figure 1:
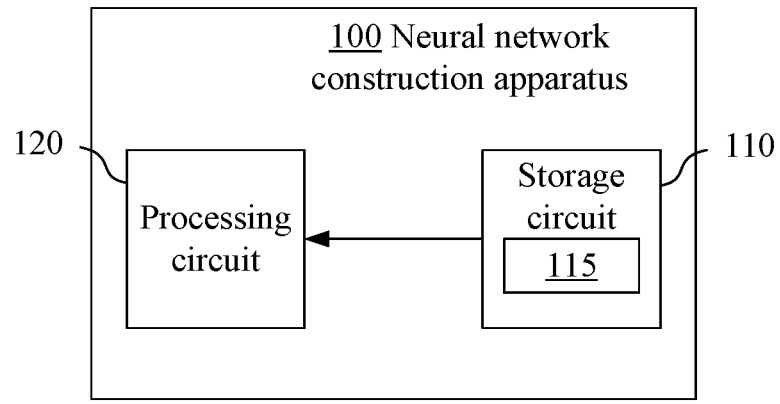
FIG. 1 illustrates a block diagram of a neural network construction apparatus having average quantization mechanism according to an embodiment of the present invention.

Reference is now made to FIG. 1. FIG. 1 illustrates a block diagram of a neural network construction apparatus 100 having average quantization mechanism according to an embodiment of the present invention. The neural network construction apparatus 100 includes a storage circuit 110 and a processing circuit 120.

The storage circuit 110 can be any storage device configured to store data, such as but not limited to a random access memory (RAM), a read only memory (ROM) or a hard drive. It is appreciated that in different embodiments, the storage circuit 110 may only include one of the storage devices described above or a multiple of the storage devices described above to store different types of data. In an embodiment, the storage circuit 110 is configured to store a computer executable command 115.

The processing circuit 120 is electrically coupled to the storage circuit 110. In an embodiment, the processing circuit 120 is configured to retrieve and execute the computer executable command 115 from the storage circuit 110. The computer executable command 115 includes such as, but not limited to firmware/driver and related commands of the storage circuit 110 or other hardware modules to access the signal or data of the storage circuit 110 to perform calculation so as to execute the function of the neural network construction apparatus 100.

The operation of the neural network construction apparatus 100 is described in detail in the following paragraphs.

At first, the processing circuit 120 retrieves a weight combination included in each of network layers of a neural network. In an embodiment, the related data of the neural network can be stored in the storage circuit 110 and retrieved by the processing circuit 120.

Figure 2:
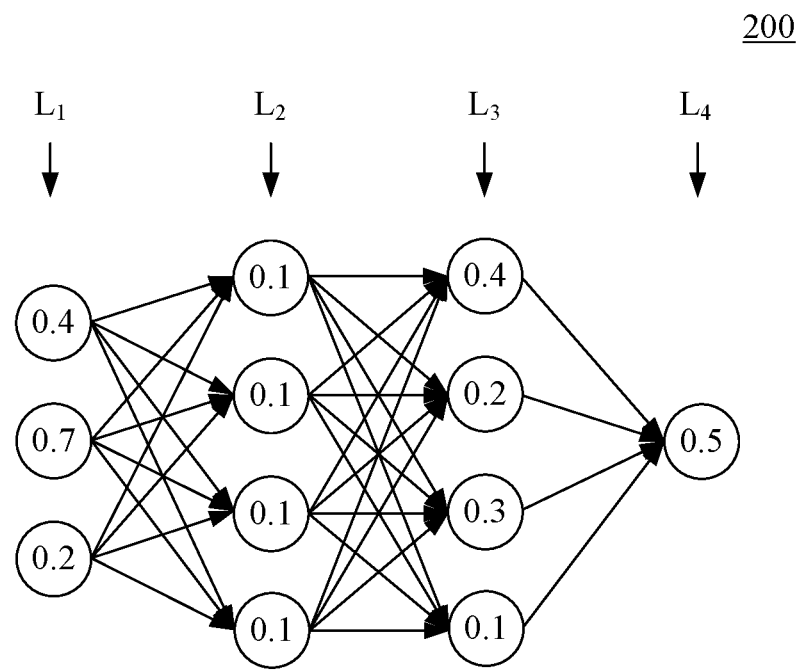
FIG. 2 illustrates a diagram of a neural network according to an embodiment of the present invention.

Reference is now made to FIG. 2 at the same time. FIG. 2 illustrates a diagram of a neural network 200 according to an embodiment of the present invention.

The neural network 200 includes network layers $L_1 \sim L_4$. The network layers $L_1$ is an input layer, the network layer $L_N$ is an output layer, and the network layers $L_2 \sim L_3$ are hidden layers. Each of the network layers $L_1 \sim L_4$ includes a weight combination, and the weight combination includes a plurality of floating-point weights. In FIG. 2, each of the floating-point weights is illustrated as a circle. As a result, the number of the weights included in each of the network layers $L_1 \sim L_4$ is 3, 4, 4 and 1.

Before the neural network 200 is trained, the weights included in the weight combination of each of the network layers can be generated according to random numbers. In a numerical example, the three weights included in the weight combination of the network layer $L_1$ have the values of 0.4, 0.7 and 0.2. The four weights included in the weight combination of the network layer $L_2$ have the values of 0.1, 0.1, 0.1 and 0.1. The four weights included in the weight combination of the network layer $L_3$ have the values of 0.4, 0.2, 0.3 and 0.1. The one weight included in the weight combination of the network layer La has the value of 0.5.

It is appreciated that in different usage scenarios, the neural network may include different numbers of network layers, and each of the network layers may include different numbers of weights depending on practical requirements. The present invention is not limited to the numbers illustrated in FIG. 2.

Further, the processing circuit 120 generates a loss function according to the weight combination of all the network layers and a plurality of target values.

In an embodiment, take the neural network 200 as an example, after receiving training input values from the input layer (network layer $L_1$), the neural network 200 perform convolution operation according to the weight combination of each of the network layers $L_1 \sim L_N$ and generates predicted values at the output layer (network layer $L_N$). A loss function is used to calculate a difference between the predicted values and the target values and is further used to evaluate the learning result of the neural network 200. In an embodiment, since the predicted values are related to the weight combination of each of the network layers $L_1 \sim L_N$, the weight combination of each of the network layers $L_1 \sim L_N$ can be denoted as θ and the target values are denoted as Y such that the loss function is denoted as the function of θ and Y: $L(θ,Y)$.

It is appreciated that according to different applications, the processing circuit 120 can use different forms of loss functions. The present invention is not limited to a certain form of loss function.

Corresponding to each of the network layers, the processing circuit 120 calculates a Gini coefficient of the weight combination and accumulates the Gini coefficient of each of the network layers as a regularized correction term. The Gini coefficient is used to rank the weights of the weight combination (e.g., from the smallest one to the largest one) and calculate cumulative percentages. The calculation result stands for the distribution condition of the weights of the weight combination.

Figure 3A:
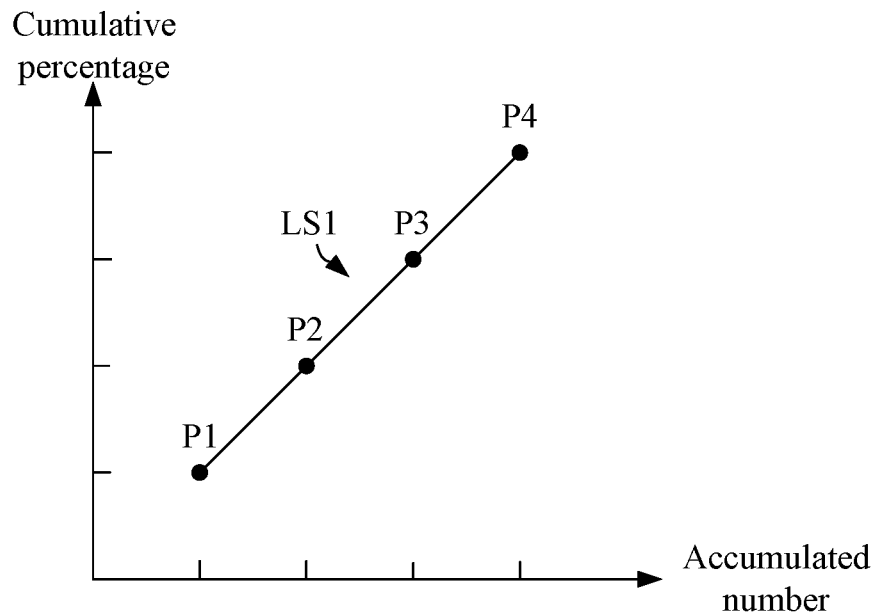
FIG. 3A illustrates a diagram of cumulative percentages of the weight combination of the network layer $L_2$ according to an embodiment of the present invention.
Figure 3B:
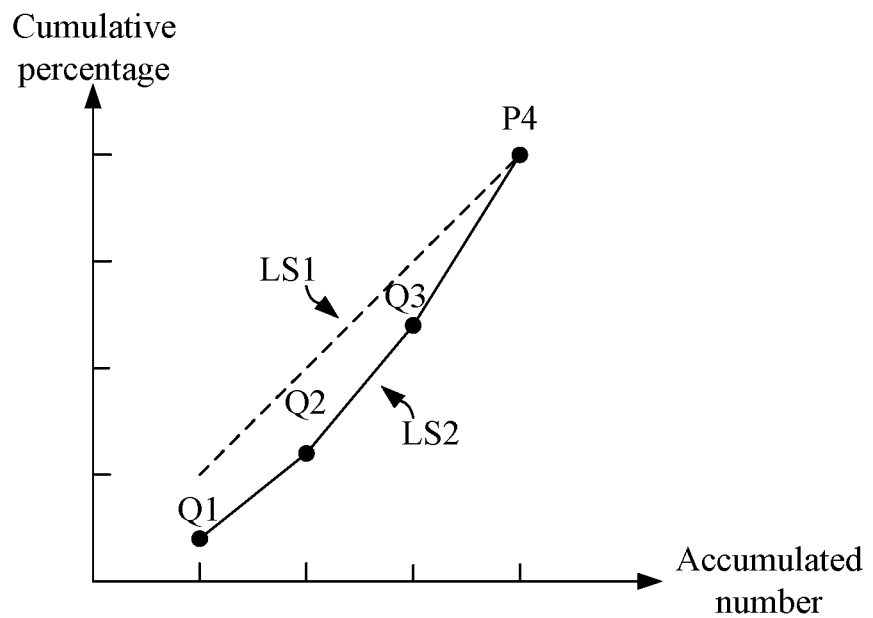
FIG. 3B illustrates a diagram of cumulative percentages of the weight combination of the network layer $L_3$ according to an embodiment of the present invention.

Reference is now made to FIG. 3A and FIG. 3B. FIG. 3A illustrates a diagram of cumulative percentages of the weight combination of the network layer $L_2$ according to an embodiment of the present invention. FIG. 3B illustrates a diagram of cumulative percentages of the weight combination of the network layer $L_3$ according to an embodiment of the present invention. The X-axis is the accumulated number of the weights. The Y-axis is the cumulative percentages of the weights. The largest result of the cumulative percentages is 1 (i.e., 100%).

As illustrated in FIG. 3A, the four weights of the weight combination included in the network layer $L_2$ are ranked to be 0.1, 0.1, 0.1 and 0.1 and the accumulation results corresponding to the positions 1~4 of the X-axis are 0.25, 0.5, 0.75 and 1 (corresponding to 25%, 50%, 75% and 100%). These accumulation results correspond to four points P1~P4 of a straight line LS1.

Since the four weights of the weight combination included in the network layer $L_2$ are the same, the distribution is even. As a result, the straight line LS1 in FIG. 3A corresponds to the condition of being even. The Gini coefficient of the weight combination included in the network layer $L_2$ is 0.

As illustrated in FIG. 3B, the four weights of the weight combination included in the network layer $L_2$ are ranked to be 0.1, 0.2, 0.3 and 0.4, corresponding to the order from the smallest value to the largest value, and the accumulation results corresponding to the positions 1~4 of the X-axis are 0.1, 0.3, 0.6 and 1.0 (corresponding to 10%, 30%, 60% and 100%). These accumulation results correspond to four points P1~P4 of a polygonal line LS2.

Since the four weights of the weight combination included in the network layer $L_3$ are all different, the distribution is highly uneven. When the straight line LS1 in FIG. 3A is illustrated as a dashed line in FIG. 3B, the polygonal line LS2 is shown to be under the straight line LS1. The Gini coefficient of the weight combination included in the network layer $L_3$ is the area between the polygonal line LS2 and the straight line LS1.

Based on the above description, the Gini coefficient has a larger value when a distribution of the weight combination is more uneven and has a smaller value when the distribution of the weight combination is more even.

As a result, after the processing circuit 120 accumulates the Gini coefficient of the weight combination of each of the network layers, a regularized correction term is generated. In an embodiment, the regularized correction term is denoted as a function related to the weight combination θ of each of the network layers $L_1 \sim L_N$: $R(θ)=\Sigma Gini(Wi)$. The term Gini (Wi) represents the Gini coefficient that the Wied weight combination of the i-th network layer corresponds to.

Moreover, the processing circuit 120 merges the loss function and the regularized correction term to generate a regularized loss function to perform training on the neural network according to the regularized loss function, so as to generate the trained weight combination of each of the network layers.

Since the loss function is denoted as $L(θ, Y)$ and the regularized correction term is denoted as $R(θ)$, the regularized loss function is denoted as the combination thereof: $RL(θ,Y)=L(θ,Y)+R(θ)$.

In an embodiment, the regularized correction term can be selectively multiplied by an order correction parameter and is denoted as $RL(θ,Y)=L(θ,Y)+\lambda R(θ)$ such that the regularized correction term and the loss function have the same order. For example, in some usage scenarios, the order of the loss function is −1 ($10^{-1}$), and the order of the regularized correction term is 1 ($10^1$). Under such a condition, the order correction parameter is configured to be $10^{-2}$ such that the order of the regularized correction term is corrected to be −1.

As a result, the processing circuit 120 can make the neural network keep receiving the training input values to perform convolution operation to generate predicted values to further evaluate the learning result according to the regularized loss function. The weight combination included in each of the network layers are kept being corrected. Since the regularized loss function has a larger value when the distribution of the weight combination is uneven, the trained weight combination of the neural network obtained during training can be corrected according to the learning result to make the distribution become even.

Finally, the processing circuit 120 performs quantization on the trained weight combination of each of the network layers to generate a quantized neural network, in which each of the network layers of the quantized neural network includes the quantization weight combination. After the quantization, the quantization weight combination included in each of the network layers includes a plurality of integer weights. In an embodiment, the quantization neural network having the integer weights is implemented by an embedded system chip.

It is appreciated that the quantization can be performed by using various quantization algorithms. The present invention is not limited to a certain kind of quantization method.

Since the floating-point operation is hard for the hardware, the floating-point weights of the neural network need to be quantized to become integers when the neural network is implemented by the embedded system chip. However, the accuracy of the quantization decreases due to the unevenness of the weights. In some approaches, the weights of the neural network cannot be adjusted according the distribution condition during the training process such that the accuracy of the quantized neural network decreases.

The neural network construction apparatus having average quantization mechanism uses a Gini coefficient to allow a loss function reflecting a distribution condition of weights, such that a training process of a neural network can make the distribution of the weights even to increase the accuracy of quantization.

Figure 4:
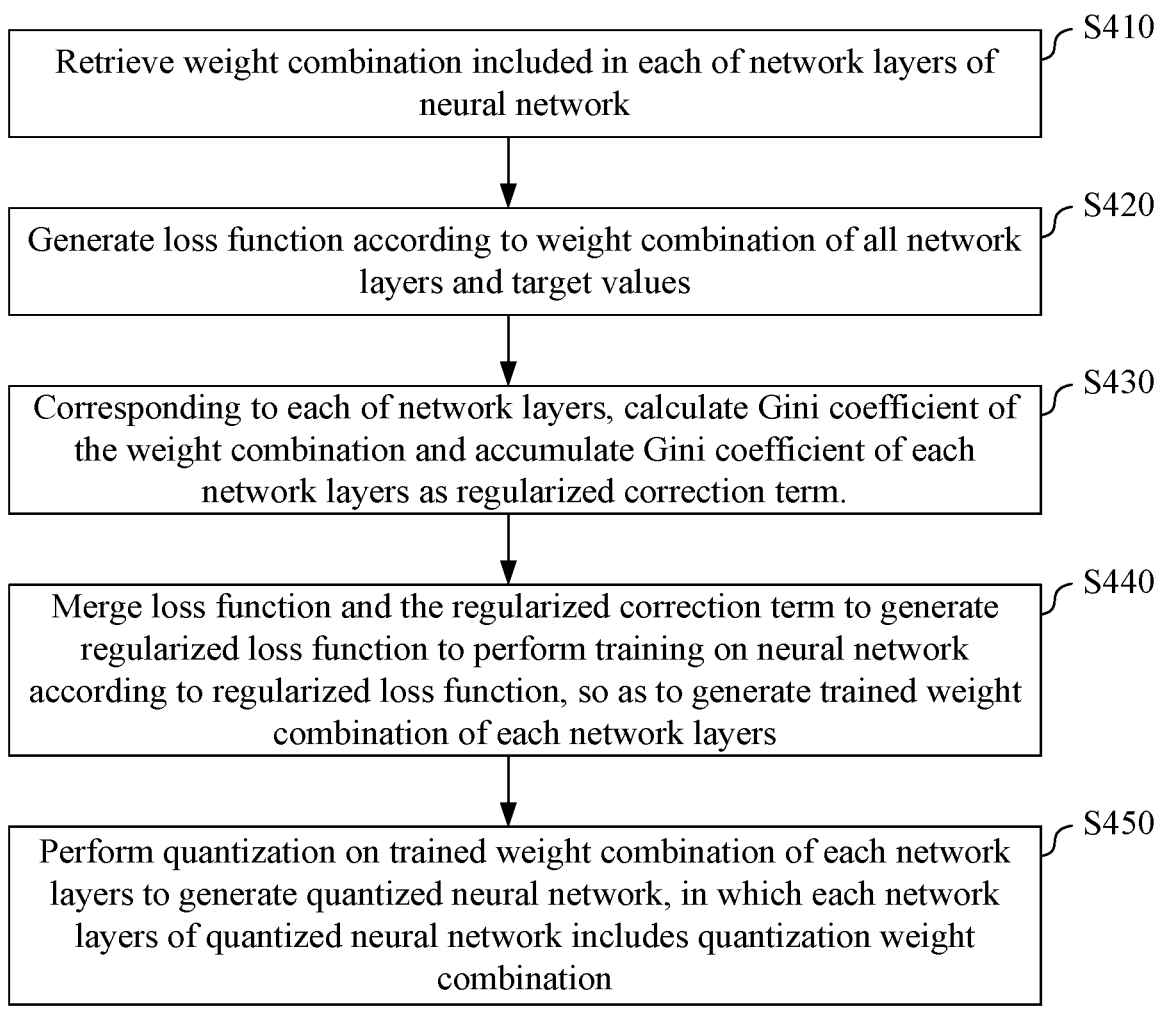
FIG. 4 illustrates a flow chart of a neural network construction method having average quantization mechanism according to an embodiment of the present invention.

Reference is now made to FIG. 4. FIG. 4 illustrates a flow chart of a neural network construction method 400 having average quantization mechanism according to an embodiment of the present invention.

In addition to the apparatus described above, the present disclosure further provides the neural network construction method 400 that can be used in such as, but not limited to, the neural network construction apparatus 100 in FIG. 1. As illustrated in FIG. 4, an embodiment of the neural network construction method 400 includes the following steps.

In step S410, the weight combination included in each of the network layers of the neural network is retrieved.

In step S420, the loss function is generated according to the weight combination of all the network layers and the target values.

In step S430, corresponding to each of the network layers, the Gini coefficient of the weight combination is calculated and the Gini coefficient of each of the network layers is accumulated as the regularized correction term.

In step S440, the loss function and the regularized correction term are merged to generate the regularized loss function to perform training on the neural network according to the regularized loss function, so as to generate the trained weight combination of each of the network layers.

In step S450, quantization is performed on the trained weight combination of each of the network layers to generate the quantized neural network, in which each of the network layers of the quantized neural network includes the quantization weight combination.

It is appreciated that the embodiments described above are merely an example. In other embodiments, it should be appreciated that many modifications and changes may be made by those of ordinary skill in the art without departing from the spirit of the disclosure.

In summary, the present invention discloses the neural network construction method and the neural network construction apparatus having average quantization mechanism that use a Gini coefficient to allow a loss function reflecting a distribution condition of weights, such that a training process of a neural network can make the distribution of the weights even to increase the accuracy of quantization.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A neural network construction method having average quantization mechanism, comprising:

retrieving a weight combination comprised in each of network layers of a neural network, wherein the weight combination comprises a plurality of floating-point weights;

generating a loss function according to the weight combination of all the network layers and a plurality of target values, wherein the loss function is a first function of the weight combination and the target values;

corresponding to each of the network layers, calculating a Gini coefficient of the weight combination and accumulating the Gini coefficient of each of the network layers as a regularized correction term, wherein the regularized correction term is a second function of the weight combination;

merging the loss function and the regularized correction term to generate a regularized loss function to perform training on the neural network according to the regularized loss function to keep modifying the floating-point weights in the weight combination, so as to generate a trained weight combination of each of the network layers;

performing quantization on the trained weight combination of each of the network layers to generate a quantized neural network, in which each of the network layers of the quantized neural network comprises the quantization weight combination, wherein the quantization weight combination comprises a plurality of integer weights, and a first distribution of the floating-point weights in the trained weight combination is even such that a second distribution of the integer weights in the quantization weight combination is even; and implementing the quantized neural network by an embedded system chip.

2. The neural network construction method of claim 1, further comprising:

multiplying the regularized correction term by an order correction parameter such that the regularized correction term and the loss function have the same order.

3. The neural network construction method of claim 1, wherein the Gini coefficient has a larger value when a distribution of the weight combination is more uneven and has a smaller value when the distribution of the weight combination is more even.

4. A neural network construction apparatus having average quantization mechanism comprising:
- a storage circuit configured to store a computer executable command; and
- a processing circuit configured to retrieve and execute the computer executable command to execute a neural network construction method, comprising:
  - retrieving a weight combination comprised in each of network layers of a neural network, wherein the weight combination comprises a plurality of floating-point weights;
  - generating a loss function according to the weight combination of all the network layers and a plurality of target values, wherein the loss function is a first function of the weight combination and the target values;
  - corresponding to each of the network layers, calculating a Gini coefficient of the weight combination and accumulating the Gini coefficient of each of the network layers as a regularized correction term, wherein the regularized correction term is a second function of the weight combination;
  - merging the loss function and the regularized correction term to generate a regularized loss function to perform training on the neural network according to the regularized loss function to keep modifying the floating-point weights in the weight combination, so as to generate a trained weight combination of each of the network layers;
  - performing quantization on the trained weight combination of each of the network layers to generate a quantized neural network, in which each of the network layers of the quantized neural network comprises the quantization weight combination, wherein the quantization weight combination comprises a plurality of integer weights, and a first distribution of the floating-point weights in the trained weight combination is even such that a second distribution of the integer weights in the quantization weight combination is even; and
  - implementing the quantized neural network by an embedded system chip.

5. The neural network construction apparatus of claim 4, wherein the neural network construction method further comprising:
- multiplying the regularized correction term by an order correction parameter such that the regularized correction term and the loss function have the same order.

6. The neural network construction apparatus of claim 4, wherein the Gini coefficient has a larger value when a distribution of the weight combination is more uneven and has a smaller value when the distribution of the weight combination is more even.

* * * * *